July 22, 1958     T. W. THOMPSON ET AL     2,844,790
INTERVAL TIMER

Filed June 12, 1953     2 Sheets-Sheet 1

INVENTORS
THOMAS W. THOMPSON
CHARLES K. RAYNSFORD
BY
Mitchell & Bechert
ATTORNEYS July 22, 1958  T. W. THOMPSON ET AL  2,844,790
INTERVAL TIMER Filed June 12, 1953  2 Sheets—Sheet 2

INVENTOR.
THOMAS W. THOMPSON
CHARLES K. RAYNSFORD
BY
Mitchell Bechert
ATTORNEYS

United States Patent Office 2,844,790
Patented July 22, 1958

2,844,790

INTERVAL TIMER

Thomas W. Thompson, Denville, and Charles K. Raynsford, Summit, N. J., assignors to Vitro Corporation of America, New York, N. Y., a corporation of Delaware Application June 12, 1953, Serial No. 361,160

15 Claims. (Cl. 324—68)

Our invention relates to improved automatic timing means employing pulses of known recurrence frequency as the basis of measurement for the timing interval.

It is an object of the invention to provide improved means of the character indicated.

Another object is to provide improved automatic timing means lending itself particularly to the comparative timing of recurrent timing intervals, as for an evaluation of the disparity between successive time intervals.

It is also an object to provide an improved means for timing a relatively long interval and for visually displaying with high accuracy the extent to which the measured interval differs from an estimated interval (approximating the measured interval), whereby the indicator may display the difference on a relatively expanded scale.

It is a specific object to meet the above objects with a relatively simple device, including an adjustable means for selecting a basic estimated interval, so that a wide range of timing intervals may be measured with relatively great accuracy and ease.

Other objects and various further features of novelty and invention will be pointed out, or will occur to those skilled in the art from a reading of the following specification, in conjunction with the accompanying drawings. In said drawings, which show, for illustrative purposes only, preferred forms of invention:

Figure 1:
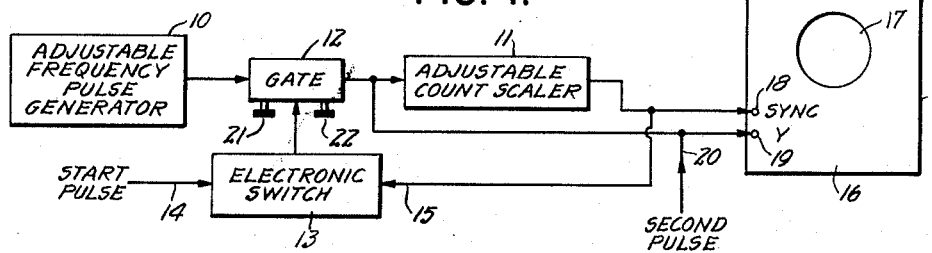
Fig. 1 is an electrical block diagram schematically illustrating component elements of timing means incorporating features of the invention.
Figure 2:
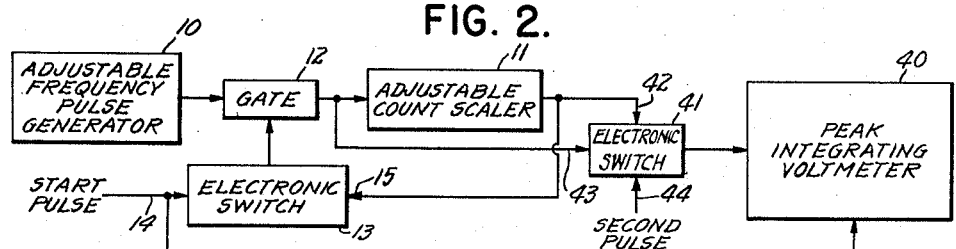
Fig. 2 is a diagram similar to Fig. 1, but illutrating an alternative form.
Figure 6:
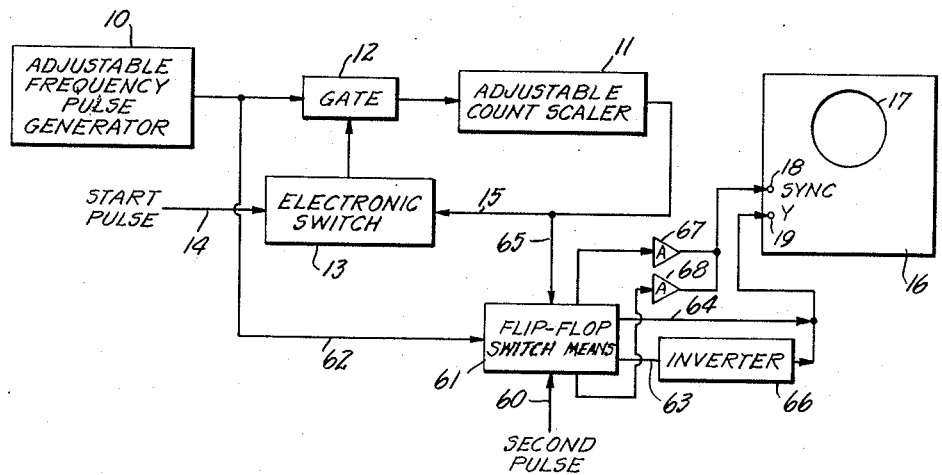
Figure 7:
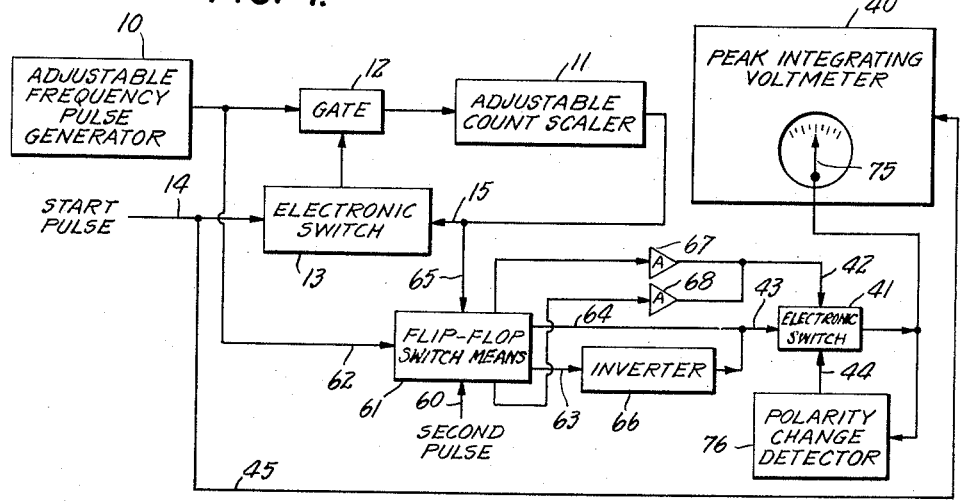
Figure 8A:
Figure 8B:
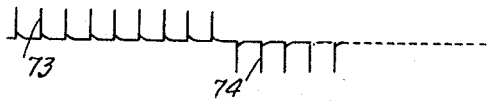

Figs. 6 and 7 are views similar to Figs. 1 and 2 but illustrating further modifications; and Figs. 8a and 8b graphically depict functioning of the indicator of Fig. 6.

Briefly stated, our invention contemplates the employment of a source of pulses of known recurrence frequency for supply to a scaler by way of a controlled gate. A pulse characterizing the beginning of the interval to be counted may be supplied through external-connection means to the gate, in order to open the gate and thus to admit to the scaler a train of pulses to be counted. Upon attainment of the selected count, which may be just short of or just after the close of the interval to be timed, the scaler output is caused to close the gate, and indicator means is brought into operation in order to evaluate the difference between the scaler count and the total interval to be measured. The end of the interval to be measured may be identified by an externally derived pulse which may either initiate or terminate the function of the indicator (depending upon whether the estimate is greater or less than the observed interval), or such externally derived pulse may at least characteristically operate the indicator, so as to permit ready evaluation of the difference between the estimated (preselected count) interval and the observed interval.

In one general form to be described, the indicator is a cathode-ray oscillograph, for which the scaler output may be caused to initiate a sweep function (X-axis) and for which a marker circuit (Y-axis) responds to pulses from the pulse generator immediately following closing of the gate; such response places a string of reference-pulse marks across the face of the tube, and external means associated with the marker circuit permit the application of a characteristic mark alongside the reference pulses to identify the pulse marking the end of the observed interval. In another general form, the indicator means is a peak-integrating voltmeter, and a gate or relay associated therewith responds to the scaler output to admit reference pulses for step integration; external-connection means receives the marker pulse which identifies the end of the observed interval so as to close the gate and thus to terminate integration, leaving the integration as a direct display on the voltmeter. In both forms, the full observed interval is the sum of the scaled count and the display indication. In still further arrangements the device lends itself to expanded-scale display of the difference between measured and estimated intervals, whether the estimate happens to have been greater or less than the measured interval.

Referring to Fig. 1 of the drawings, our invention is shown in application to timing means employing a pulse generator 10 and a count scaler 11, with a gate 12 connecting the generator to the scaler. The gate 12 may include, but we have separately shown, switching means 13 for opening the gate and for closing the gate; the gate 12 preferably includes adjustable means 21 for selecting a first gate-output level for the closed condition of the gate, and separate adjustable means 22 for selecting a substantially larger level of output for the gate-open condition. By the terms "opening" and "closing" as applied to the gate 12, it will be understood that there is contemplated such a change in level in the signal passed through the gate as to enable proper discriminating interpretation by the count scaler 11. First external connection means 14 may be associated with the switch 13 for opening the gate 12, as upon receipt of a pulse identifying the commencement of an interval to be observed. Pulses from generator 10 are then passed through gate 12 with a magnitude sufficient to operate scaler 11; and, when scaler 11 attains the count for which it has been set, a second connection 15 for switch 13 is operated to close the gate and thus to terminate further counting.

The indicator means 16 shown happens to be a cathode-ray oscillograph nicluding a display tube 17 and a sweep circuit with a connection 18 for initiating the sweep (X-axis). We have shown connection 18 being made to the output of the scaler, and therefore we initiate the sweep upon completion of the scaled count. The oscillograph 16 may also include marker means having a connection 19 (Y-axis) for receiving reference or marker pulses which may be derived from the generator 10, and the marker connection 19 may include external connection means 20 for receiving a second external pulse, identifying the close of the interval to be timed. By supplying the second pulse at connection 20 with a magnitude or polarity which is striking with reference to the marker pulses, such second pulse may be strikingly displayed, and the incremental count may be observed on an expanded scale.

Figure 4:
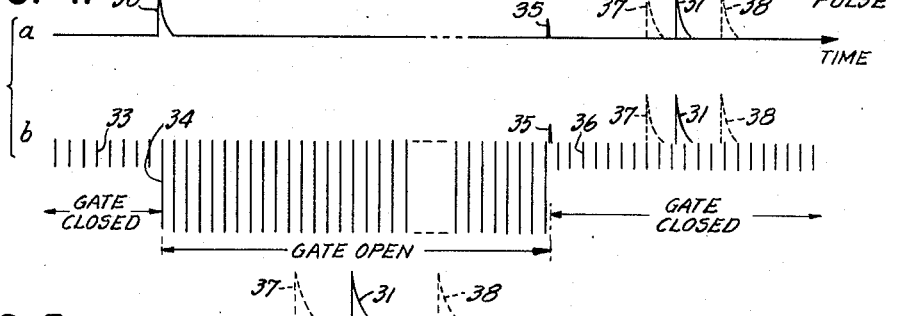
Figs. 4 and 5 are graphical representations of certain functions with respect to time, in order to illustrate the functioning of the timers of Figs. 1 and 2.
Figure 5:
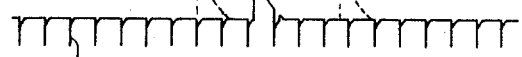

A better appreciation of the operation of the described circuit may be had by reference to the graphic representations of Figs. 4 and 5. In curve a of Fig. 4, we indicate the time-relation of the externally supplied pulses. For any one interval to be timed, the pulse 30 may identify commencement of the observed interval, and the pulse 31 may identify the close of such interval. In curve b of Fig. 4, we illustrate gate-output levels as a function of time and displayed along the same time scale as for the case of curve a. Thus, a first train of pulses 33 may characterize gate output during the closed condition and prior to reception of an externally supplied start pulse 30. Pulse 30 will open the gate 12, so that the next oncoming generator-developed pulse 34 will apper in the gate output with substantially increased magnitude; and, as long as the gate remains open, succeeding reference impulses will be of the same relatively large magnitude. As indicated above, the magnitude of pulses 34 will be sufficient to operate the scaler 11, whereas the magnitude of pulses 33 is insufficient to operate the scaler 11.

Upon completion of the scaled count, the scaler 11 will provide an output pulse 35, which is fed to the switch 13 to close the gate, thus decreasing the amplitude of succeeding pulses 36 to the reduced level which characterized the pulses 33; pulses 36 will, therefore, be ineffective to operate the scaler. In the form shown, the counter-derived pulse 35 is preferably preset to occur a relatively short time prior to completion of the observed interval and may be utilized to trigger the sweep of oscillograph 16.

Under the described circumstances, the display on the face of the oscillograph will have the appearance shown in Fig. 5, wherein the reference pulses 36 appear as a string or train, originating with the count-completion pulse 35. An externally derived pulse 31 which identifies completion of the observed interval will appear at connection 20, and, as suggested above, by appropriate selection of polarity, pulse 31 may be caused to stand out against the marker pulses 36 in the oscillograph display of Fig. 5. For the case depicted in solid lines in Figs. 4 and 5, therefore, the observed interval between the start and completion pulses 30—31 will be the sum of the known preset count on scaler 11 in terms of the known pulse-generator frequency, to which one must add the displayed additional count, which happens to be ten pulses in Fig. 5. Thus, if the preset count is 320 on scaler 11, then the interval between pulses 30—31 in Fig. 4 is 330.

As indicated generally above, our invention is particularly applicable to the observation of recurrent intervals, which are supposedly the same but which may differ to small extents. The commencement of each of these recurrent intervals may be characterized by start pulses such as the pulse 30, so as in each case to initiate the scaler count. A substandard interval will then be apparent from an observed termination pulse 37 (representing a count of 328 for the assumed case), and an excessively long interval will be apparent from observation of the pulse 38 (representing a count of 333). In Fig. 5, the pulses 37—38 appear alongside the pulse 31, and an indication is had of the spread or disparity between successive intervals which would otherwise be presumed to be alike.

In Fig. 2, we show an alternative construction in which a peak-integrating voltmeter 40 is employed as a basic display element in place of the cathode-ray oscillograph 16. Many elements of the circuit of Fig. 2 will, however, be recognized from Fig. 1 and have, therefore, been given corresponding reference numerals. The display means 40 may include an electronic switch 41 controlling the admission of pulses to be integrated thereby. Thus, we show switch 41 as including an opening connection 42 for response to scaler output upon attainment of the scaled count. Switch 41 may also include an input connection 43 for receiving the output of gate 12, so that, as long as switch 41 remains open (which happens to occur while gate 12 is closed), pulses 36 of reduced magnitude will be passed by switch 41 to the peak-integrating voltmeter 40. It is, of course, important that for the closed condition of switch 41 no residual pulses shall be passed to the voltmeter 40, so that the voltmeter may only respond to pulses passed when switch 41 is open. The externally derived second pulse 31—37—38 may be supplied at a closing connection 44 to switch 41 in order to terminate peak integration. It will be seen that in operation the circuit of Fig. 2 will accurately indicate a relatively long interval by displaying on an expanded scale (at 40) the integrated difference between the estimated (selected count at 11) interval and the observed interval. The reset connection 45 suggests that, when the next interval begins with a start impulse at 14, the integration circuit of voltmeter 40 may be discharged, thereby resetting the indicator for the next integration.

Figure 3:
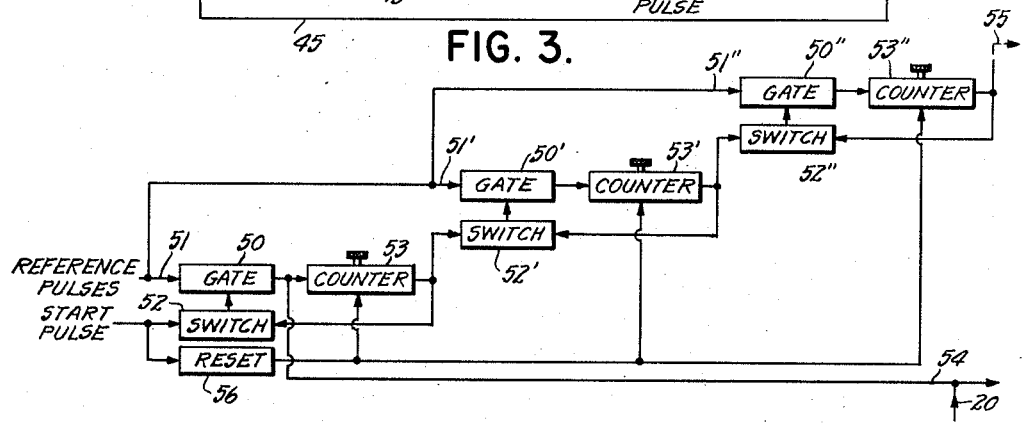
Fig. 3 is a block diagram illustrating in further detail component parts of counting means common to Figs. 1 and 2.

In Fig. 3, we show in further detail a preferred form of counter suitable for use as element 11 in either of the timers in Figs. 1 and 2. The counter of Fig. 3 is basically a succession of stages, each of which preferably counts a submultiple or a multiple of the next succeeding stage. Thus, a first stage may comprise a gate 50 continuously exposed at 51 to reference pulses derived from the generator 10 and incorporating switching means 52 for determining the open or closed condition of the gate. The output of gate 50 is supplied to an adjustable count scaler 53, and upon attainment of a preselected count, counter 53 provides an output pulse to switch 52 for closing the gate 50. Similar parts for succeeding stages are identified by primed and double-primed characters, and the counter output from one stage is fed to the gate-opening connection of the switch for the next succeeding stage in order to produce continuity of the counting chain. The marker output 54 to the indicator means may be derived from any one of the gate outputs, as for the case of the gate 50 shown, and the synchronizing connection to the indicator means is available at 55 upon completion of the last stage of counting (at 53″) in the counter of Fig. 3. The switch 52 of the first stage may receive the externally supplied start pulse for opening the gate 50 upon commencement of the interval to be observed, and we illustrate at 56 that a reset signal may be applied in common to all counters 53—53′—53″ upon receipt of each start pulse, thus re-enabling the entire counter mechanism.

In operation, it is convenient to have succeeding counting stages act for adjacent decades, as for example, thousands in the counter 53, hundreds in the counter 53′, and tens in the counter 53″. For the assumed preselected interval of 320, mentioned above, counter 53 will therefore be set for zero, so that the first start pulse immediately opens and closes gate 50 without loss of count, and thereupon opens gate 50′. Counter 53′ will have been set for three (meaning 300); and, upon completion of a count of 300, counter 53′ produces an output pulse to close gate 50′ and to open gate 50″. Counter 53″ will have been set for two (meaning 20), so that thereafter counter 53″ will count to 20 before producing an output pulse at 55 to initiate the sweep, or to start peak integration, as the case may be. At the same time, the last gate 50″ is closed, and the display of the difference measurement proceeds, utilizing the reference pulses derived at 54 and terminating upon receipt of the interval-closing pulse at 20.

In Figs. 6 and 7, we show a further modified form of the invention; this form may be viewed as a general-purpose instument, because it lends itself to the automatic display of the difference between the estimated interval and the observed interval, regardless of whether the estimate is greater or less than the observed interval. In Fig. 6, the modified general-purpose instrument is shown in application to a cathode-ray oscillograph 16 and in Fig. 7 to a peak-integrating voltmeter 40. In either case, the display indicates the polarity of the difference, so that, by noting this polarity and the extent of the difference, in conjunction with the preset count on the scaler 11, one may have an immediate reading of the duration of the observed interval.

In the arrangement of Fig. 6, the so-called second pulse, which identifies the end of the observed interval, is fed to one controlling input 60 of switching means including a flip-flop circuit or multivibrator 61. Pulses from the generator 10 are continuously supplied in line 62 to the flip-flop circuit 61 and, if the second pulse at 60 is the first control pulse to strike the flip-flop circuit 61 (as when the preset count at 11 exceeds the observed interval), then the reference pulses from line 62 will be relayed into a first output line 63, to the exclusion of a second output line 64. If, on the other hand, the preselected count at 11 is short of the observed interval, the scaler output pulse will first be fed to the other control connection 65 for the flip-flop circuit 61; in such event, the pulses from line 62 will be relayed to the output line 64 to the exclusion of the output line 63. For more clearly identifying marker pulses passed in line 63, with respect to pulses passed in line 64, we have shown an inverter 66 in one of these lines, and both lines 63—64 are tied to the marker (Y-axis) connection 19 of the oscillograph 16. Thus, if the preset count at 11 is short of the observed interval, pulses of one polarity will be relayed in line 64 direct to the oscilloscope connection 19; but, if the preselected count is greater than the observed interval, the second pulse at 60 will control admission of pulses in line 63, for phase inversion to produce pulses of opposite polarity at the connection 19.

The sweep for display of the pulses appearing in lines 63—64 may be initiated upon receipt of pulses in lines 63—64, whichever event occurs first. Thus, isolation amplifiers 67—68 may be connected in the respective arms of the flip-flop circuit to respond to the first control pulse of a given cycle, and the outputs of amplifiers 67—68 may be tied to the synchronization connection 18 in order to initiate the sweep.

In operation, the circuit of Fig. 6 will produce no distinguishable indications on the tube 17 until a sweep has been initiated, and this will not occur until a control pulse is received at 60 or at 65, depending upon whether the scaler 11 has been preset for an interval greater or less than the observed interval. The start pulse identifying commencement of the observed interval will, as before, be applied at 14 to open the gate 12 and to commence counting at 11. If the count at 11 exceeds the observed interval, then the second pulse, which identifies the close of the observed interval, will first arrive at 60 to set circuit 61 for admission of pulses in line 63 and, at the same time, through amplifier 68, to initiate a sweep of the oscillograph. Because the necessary correction for this assumed case will involve subtraction of the displayed information from the preselected count, we prefer that the inverter 66 shall establish negative polarity (downwardly deflecting) voltages at the marker connection 19.

The assumed situation is depicted in Fig. 8a, showing that the display at 17 will be characterized by a train of negative pulses 70; the negative pulses commence with the occurrence of the second pulse 60 and terminate upon arrival of the scaler output pulse at 65, at which time the flip-flop circuit 61 is shifted to pass reference pulses from line 62 into line 64, thus effectively changing the polarity of these pulses so that a train of positive pulses 71 may follow the train of negative pulses 70. In the case of Fig. 8a, the train commences with thirteen negative pulses, meaning that the number "13" will have to be subtracted from the preset count at 11. It will be understood that, if the preselected count a 11 had erred on the underside of the observed interval, then input 65 to the flip-flop circuit 61 would first have been energized to initiate the sweep and to cause first a train of positive impulses 73, followed by a train of negative pulses 74 upon arrival of the second pulse at 60. For the situation displayed in Fig. 8b, there are nine such positive pulses, meaning that the number "9" will have to be added to the preset count at 11.

In Fig. 7, we show adaptation of the principles of the circuit of Fig. 6 to an indicator 40, which may be of the peak-integrating variety discussed in connection with Fig. 2. Much of the circuit remains the same and, therefore, the same reference numerals are employed, where applicable. The voltmeter 40 may include or be controlled by the switch 41, which will receive opening impulses in line 42 from either of amplifiers 67—68, depending upon which side of the flip-flop circuit 61 is first energized. Once opened, switch 41 will admit a train of pulses supplied at input 43; these pulses will be of a polarity depending upon which side of the flip-flop circuit is operated, and appropriately poled pulses will then be fed to the voltmeter 40 for integration. It will be understood that, if the pulses are positive (meaning that they have been received from line 64), then the indicator needle 75 may be deflected to the right of a central position, representing zero. If, on the other hand, negative pulses are received, as from the inverter 66, then needle 75 will be deflected to the left of center. In order to stop integration at the end of a pulse train, polarity-change detector means 76 may respond to the output of switch 41 to derive a switch-closing impulse for application at 44, thus assuring that the needle 75 will not depart from its maximum reading until a resetting impulse recurs in line 45, as upon the onset of the next start pulse at 14.

It will be seen that we have described a relatively simple mechanism for quickly and accurately indicating a timed interval. The interval may be ascertained to any degree of accuracy, depending upon the basic frequency of the pulse generator 10 with reference to the interval to be measured. If desired, and as indicated in the labels for generator 10, the frequency thereof may be selected to suit the interval to be measured and the desired accuracy of measurement, and of course counting decades or other multiples may be provided in sufficient plurality (as suggested in Fig. 3) to meet the basic counting requirements. Either of the described general forms lends itself to "one-shot" observations or to recurrent-interval observations; but, for convenience and possibly for statistical evaluation, one may prefer oscillographic display when measuring recurrent intervals, so that a plurality or spread of pulses 31—37—38 may be observed simultaneously. A peak-indicating voltmeter lends itself more readily to single-shot observations, and, by a proper choice of circuit constants, the integrated function may be held on the face of the meter 40.

While we have described the invention in detail for the preferred forms shown, it will be understood that modifications may be made within the scope of the invention as defined in the claims which follow.

We claim:

1. In a timing device of the character indicated, pulse-generator means for generating a continuous train of pulses of known recurrence frequency, a count scaler for counting pulses produced by said generator and preset to develop a control signal upon achievement of a given count, gate means connecting said generator to said scaler, indicator means responsive to said control signal for indicating pulses produced by said generator means immediately following attainment of the count for which said scaler has been set, said indicator means being connected to the output of said scaler, externally controlled gate-opening means, gate-closing means connecting the output of said scaler to said gate, and means for impressing on said indicator means pulses from said generator immediately following closing of said gate.

2. A timing device according to claim 1, in which said indicator means include a cathode-ray tube including sweep means connected to the output of said scaler and therefore initiated upon attainment of the count for which said scaler has been set, and marker means responsive to pulses from said generator immediately following the closing of said gate.

3. A timing device according to claim 2, in which said indicator means includes external-connection means connected to said marker circuit, whereby a characteristic externally supplied marking pulse may be applied to said indicator means to indicate alongside marker pulses from said generator the relative time-placement of said externally supplied pulse.

4. A timing device according to claim 1, in which said indicator means is a peak-integrating voltmeter with gate means responsive to the output of said scaler for admitting pulses from said generator to said voltmeter upon attainment of the count for which said scaler has been set and externally controlled closing means for said second-mentioned gate for terminating integration by said voltmeter.

5. In a timing device of the character indicated, pulse-generator means for generating a train of pulses of known recurrence frequency, adjustable count-scaler means for counting a preselected number of pulses from said generator and developing a control signal upon achievement of said number of pulses, gate means connecting said generator to said scaler, external-connection means for opening said gate, a connection from said scaler to said gate for closing said gate upon attainment of the preselected count, said gate including amplitude-limiting means determining a first output amplitude to said scaler for a gate-open condition and a second output amplitude to said scaler for a gate-closed condition, said second output amplitude being insufficient to operate said scaler, and indicator means including means connected to the output of said scaler for initiating an indicating operation, and means responsive to the output of said generator means for actuating said indicator.

6. A timing device according to claim 5, in which said adjustable count-scaler means includes a plurality of counter stages and separate means for selectively adjusting the count in each of said stages.

7. A device according to claim 6, in which each of said stages comprises a gate, a counter connected to said gate, external-connection means for opening said gate, and a connection from the output of said counter to said gate for closing said gate, the counter output for one stage being connected to the external gate-opening connection of the next succeeding stage, whereby upon attainment of the preselected count in the first stage the count in the second stage may proceed.

8. In a timing device of the character indicated, pulse-generator means for generating a train of pulses of known recurrence frequency, a count scaler for counting pulses produced by said generator and developing a control signal upon achievement of a given count, gate means connecting said generator to said scaler, indicator means responsive to pulses immediately preceding attainment of the count for which said scaler has been set, said indicator means being connected to the output of said scaler, externally-controlled gate-opening means, gate-closing means connecting the output of said scaler to said gate means, and means including an externally operated connection for impressing on said indicator means pulses from said generator immediately preceding closing of said gate.

9. In a timing device of the character indicated, pulse-generator means continuously generating a train of pulses of known recurrence frequency, a count scaler for counting a sequence containing a predetermined number of pulses produced by said generator, said scaler having input and output connections and developing a control signal in response to counting said predetermined number, gate means connecting said generator to the input connection of said scaler, externally-controlled opening means for said gate means, gate-closing means connecting the output connection of said scaler to said gate means, whereby the ouput of said scaler may not only close said gate means but may also provide at said output connection an internally developed control signal, external-connection means for receiving an externally developed control signal, and meter means connected to said external-connection means and to the output connection of said scaler and responsive to one of said control signals to commence a measuring operation and responsive to the other of said control signals to terminate said measuring operation, said meter means being also connected to the output of said generator means so that measurement may be a function of the number of pulses between said control signals.

10. In a timing device of the character indicated, pulse-generator means for continuously generating a train of pulses of known recurrence frequency, a count scaler for counting a given count representing a sequence containing a predetermined number of pulses produced by said generator and developing a control signal upon achievement of said given count, gate means connecting said generator to said scaler, externally-controlled opening means for said gate means, gate-closing means connecting the output of said scaler to said gate means, whereby the output of said scaler may not only close said gate means but may also provide an internally developed control signal, external-connection means for receiving an externally developed control signal, measuring means including an indicator and a switch being connected to the output of said scaler and to said external-means, said switch having a first control connection responsive to one of said control signals and having a second control connection responsive to the other of said control signals, said switch connecting said generator means to said indicator without polarity reversal for one controlled operation thereof.

11. In a timing device of the character indicated, pulse-generator means for generating a continuous train of pulses of known recurrence frequency, a count scaler for counting a predetermined given count of pulses produced by said generator and developing a control signal upon achievement of said given count, gate means connecting said generator to said scaler, externally-controlled opening means for said gate means, gate-closing means connecting the output of said scaler to said gate means, whereby the output of said scaler may not only close said gate means but may also provide an internally developed control signal, external-connection means for receiving an externally developed control signal, measuring means including an indicator and a switch being connected to said external-connection means and to the output of said scaler, said switch having a first control connection responsive to one of said control signals and having a second control connection responsive to the other of said control signals, said switch connecting said generator means to said indicator and including phase-inverter means operative for one controlled operation thereof, whereby for said one controlled operation phase-inverted pulses may be supplied to said indicator.

12. In a timing device of the character indicated, pulse-generator means for continuously generating a train of pulses of known recurrence frequency, a count scaler for counting pulses produced by said generator and preset to develop a control signal upon achievement of a given count, gate means connecting said generator to said scaler, externally-controlled opening means for said gate means, gate-closing means connecting the output of said scaler to said gate means, whereby the output of said scaler may not only close said gate means but may also provide an internally developed control signal, external-connection means for receiving an externally developed control signal, measuring means including an indicator and a switch being connected to said external-connection means and to the output of said scaler, said switch having a first control connection responsive to one of said control signals and having a second control connection responsive to the other of said control signals, said switch connecting said generator means to said indicator without polarity reversal for one controlled operation thereof, said switch also including phase-inverter means operative for the other controlled operation thereof, whereby for said one controlled operation non-inverted pulses may be supplied to said indicator and for said other controlled operation phase-inverted pulses may be supplied to said indicator.

13. A timing device according to claim 12, in which said switch includes a multivibrator.

14. In a timing device of the character indicated, pulse-generator means continuously generating a train of pulses of known recurrence frequency, a count scaler for counting pulses produced by said generator and preset to develop a control signal upon achievement of a given count, gate means connecting said generator to said scaler, externally controlled opening means for said gate means, gate-closing means connecting the output of said scaler to said gate means, whereby the output of said scaler may not only close said gate means but may also provide an internally developed control signal, external-connection means for receiving an externally developed control signal, a peak-integrating voltmeter, a gate controlling admission of pulses from said generator to said voltmeter, opening means for said gate and responsive to one of said control signals, and closing means for said gate and responsive to the other of said control signals.

15. In a timing device of the character indicated, pulse-generator means for continuously generating a train of pulses of known recurrence frequency, a count scaler for counting pulses produced by said generator and preset to develop a control signal upon achievement of a given count, gate means connecting said generator to said scaler, externally controlled opening means for said gate means, gate-closing means connecting the output of said scaler to said gate means, whereby the output of said scaler may not only close said gate means but may also provide an internally developed control signal, external-connection means for receiving an externally developed control signal, display means, a gate controlling admission of pulses from said generator to said display means, opening means for said gate and responsive to one of said control signals, closing means for said gate and responsive to the other of said control signals, and polarity-control means for pulses supplied to said display means and responsive to the onset of one of said control signals in advance of the other to produce a first polarity control for pulses supplied to said display means and responsive to the onset of the other of said control signals in advance of said one to produce a reversed polarity control for pulses supplied to said display means.

References Cited in the file of this patent

UNITED STATES PATENTS

| | | |
|---|---|---|
| 2,274,158 | Penther | Feb. 24, 1942 |
| 2,301,197 | Bradford | Nov. 10, 1942 |
| 2,403,873 | Mumma | July 9, 1946 |
| 2,422,698 | Miller | June 24, 1947 |
| 2,454,782 | De Rosa | Nov. 30, 1948 |
| 2,558,447 | MacSorley | June 26, 1951 |
| 2,665,410 | Burbeck | Jan. 5, 1954 |